United States Patent
Atmakuri et al.

(10) Patent No.: US 10,838,659 B2
(45) Date of Patent: Nov. 17, 2020

(54) CONTROLLING WRITE ACCESS TO A MEMORY STRUCTURE BASED ON WRITE REQUEST PRIORITY

(71) Applicant: INTERNATIONAL BUSINESS MACHINES CORPORATION, Armonk, NY (US)

(72) Inventors: Varnika Atmakuri, West Windsor, NJ (US); Adam Collura, Hopewell Junction, NY (US); James Bonanno, Wappingers Falls, NY (US); Suman Amugothu, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/270,633

(22) Filed: Feb. 8, 2019

(65) Prior Publication Data

US 2020/0257468 A1 Aug. 13, 2020

(51) Int. Cl.
*G06F 3/00* (2006.01)
*G06F 3/06* (2006.01)
*G06F 12/123* (2016.01)

(52) U.S. Cl.
CPC .......... *G06F 3/0659* (2013.01); *G06F 3/0604* (2013.01); *G06F 3/0673* (2013.01); *G06F 12/123* (2013.01)

(58) Field of Classification Search
CPC ..... G06F 3/0659; G06F 3/0604; G06F 3/0673
See application file for complete search history.

(56) References Cited

U.S. PATENT DOCUMENTS

| | | |
|---|---|---|
| 6,138,211 A | 10/2000 | Ahn et al. |
| 7,401,189 B2 | 7/2008 | Bell, Jr. et al. |
| 8,065,496 B2 | 11/2011 | Okawa et al. |
| 8,468,536 B2 | 6/2013 | Berger et al. |
| 8,909,907 B2 | 12/2014 | Bonanno et al. |
| 10,055,360 B2 | 8/2018 | Greenspan et al. |

(Continued)

OTHER PUBLICATIONS

Ghandeharizadeh, Shahram et al. "CAMP: A Cost Adaptive Multi-Queue Eviction Policy for Key-Value Stores", Computer Science Department, USC; Database Laboratory Technical Report May 20, 2015; pp. 1-24.

(Continued)

*Primary Examiner* — Reginald G Bragdon
*Assistant Examiner* — Michael L Westbrook
(74) *Attorney, Agent, or Firm* — Cantor Colburn LLP; William Kinnaman

(57) ABSTRACT

Examples of techniques for controlling write requests to a memory structure having limited write ports are described herein. An aspect includes storing, in a first queue, write requests received from a first source having a first priority. Another aspect includes storing, in a second queue, write requests received from a second source having a second priority, wherein the second priority is lower than the first priority. Aspects also include identifying a selected queue from the first queue and the second queue based on a selection algorithm, which is a function of a state associated with the first queue and the second queue. Aspects further include forwarding a write request from the selected queue to a write port of the memory structure.

17 Claims, 8 Drawing Sheets

(56) References Cited

U.S. PATENT DOCUMENTS

| | | |
|---|---|---|
| 10,078,598 B1 | 9/2018 | Wallace et al. |
| 10,102,147 B1 | 10/2018 | Benhanokh et al. |
| 10,545,701 B1* | 1/2020 | Mathews .............. G06F 3/0659 |
| 2004/0205312 A1* | 10/2004 | Zlotnick ............. G06F 11/2069 |
| | | 711/162 |
| 2014/0089578 A1 | 3/2014 | Asamoto |
| 2015/0278114 A1 | 10/2015 | Kumabe et al. |
| 2016/0055003 A1 | 2/2016 | Clancy et al. |
| 2018/0046583 A1 | 2/2018 | Bybell et al. |
| 2018/0095875 A1 | 4/2018 | Zhang et al. |
| 2018/0365171 A1 | 12/2018 | Brandt et al. |

OTHER PUBLICATIONS

Jin, Peiquan et al. "AD-LRU: An Efficient Buffer Replacement Algorithm for Flash-Based Databases", School of Computer Science and Technoloigy of China et al; Preprint submitted to Elsevier Sep. 26, 2011; 33 pgs.

Meng, Lin et al. "An Optimal CAM-based Separated BTB for a Superscalar Processor" International Journal of Computer Theory and Engineering, vol. 8, No. 2, Apr. 2016; 7 pgs.

Yuan, Youwei et al. "PR-LRU: A Novel Buffer Replacement Algorithm Based on the Probability of Reference for Flash Memory", IEEE Access, Date of Publication: Jul. 7, 2017; Current Version: Jul. 24, 2017; IEEE Translations; vol. 5, 2017; pp. 12626-12634.

* cited by examiner

CONTROLLING WRITE ACCESS TO A MEMORY STRUCTURE BASED ON WRITE REQUEST PRIORITY

BACKGROUND

The present disclosure relates to accessing memory structures. More specifically, the disclosure relates to controlling write access to a least recently used (LRU) memory structure.

For any type of table that is more than one way set associative (i.e., a table that has more than one column) such as, but not limited to a branch target buffer (BTB) or cache, an LRU table is used to keep track of which set (column) has been used the most frequently or infrequently. Generally, the LRU table is stored in a separate memory structure such as a register file or latch-based structure, referred to herein as an LRU memory structure, that is read when a system needs to know which set can be replaced with incoming data if all the sets in a given row of a table are full.

While there are multiple stages in a processor's pipeline that need to access the LRU memory structure, the most common is when a new entry needs to be installed, or an existing entry needs to be updated for accuracy, this is referred to as the completion timeframe. At completion timeframe, the LRU memory structure is read in order to determine which column of a particular row in the table can be replaced if a new entry needs to be created. Whether a new entry is initialized or an existing set in the table is updated, the LRU structure needs to be updated to reflect this change.

In the context of branch prediction, the BTB is a table that stores metadata such as direction and target address history about the most recently used branches in an address space. The direction of a branch can either be taken or not taken dependent on the behavior of the branch. This information is stored in the BTB so that it does not need to be recomputed every time it is needed, rather is just read from the BTB and used when appropriate. At branch prediction timeframe, the BTB is read for information about branches in a section of the current instruction stream. When the branch information read out of the BTB is used to make a prediction about a branch's direction and target, the corresponding LRU row needs to be updated as well. The BTB set that just provided the branch's information is made most recently used (MRU), indicating that it was needed for a prediction and is useful information to be kept in the BTB.

Currently, in order to support writes to the LRU at both the completion and prediction time frame, the LRU memory structure requires two write ports to handle these independent time frames. Because the writes at different time frames can occur simultaneously, the LRU needs to have a write port for each time frame. However, having several write ports makes the LRU memory structure larger, more power consuming and more complex.

SUMMARY

According to an embodiment described herein, a system for controlling write requests to a memory structure having limited write ports is provided. The system includes a first queue configured to store write requests received from a first source having a first priority and a second queue configured to store write requests received from a second source having a second priority, wherein the second priority is lower than the first priority. The system also includes a multiplexer in communication with the first queue and the second queue. The multiplexer is configured to forward a write request from the first write queue to a write port of the memory structure based on a determination that the first write queue is not empty. The multiplexer is also configured to forward a write request from the second write queue to the write port of the memory structure based on a determination that the first write queue is empty and that the second write queue is not empty.

According to another embodiment described herein, a method for controlling write requests to a memory structure having limited write ports. The method includes storing, in a first queue, write requests received from a first source having a first priority. The method also includes storing, in a second queue, write requests received from a second source having a second priority, wherein the second priority is lower than the first priority. The method further includes identifying a selected queue from the first queue and the second queue based on a selection algorithm, which is a function of a state associated with the first queue and the second queue. The method also includes forwarding a write request from the selected queue to a write port of the memory structure.

According to another embodiment described herein, an apparatus can include hardware logic to control write requests to a memory structure having limited write ports. The apparatus is configured to store, in a first queue, write requests received from a first source having a first priority. The apparatus is also configured to store, in a second queue, write requests received from a second source having a second priority, wherein the second priority is lower than the first priority. The apparatus is further configured to identify a selected queue from the first queue and the second queue based on a selection algorithm, which is a function of a state associated with the first queue and the second queue. The apparatus is also configured to forward a write request from the selected queue to a write port of the memory structure.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

In exemplary embodiments, a least recently used (LRU) memory structure having a single write port is provided. The LRU memory structure is configured to receive writes from both a prediction time queue and a completion time queue that are combined using a multiplexer. The multiplexer is configured to provide any writes in the completion time queue before providing writes in the prediction time queue to the write port. In exemplary embodiments, when the prediction time queue is full, a prediction write request can be placed in the completion time queue. While in the context of branch prediction there are two main LRU write timeframes, as will be appreciated by those of skill in the art, this methodology can be applied to any number of write timeframes with limited write ports. In exemplary embodiments, write commands in the prediction queue can be analyzed and a write to the same row can be combined and duplicate writes can be discarded. As a result, the power consumption of the system can be reduced.

Figure 1:
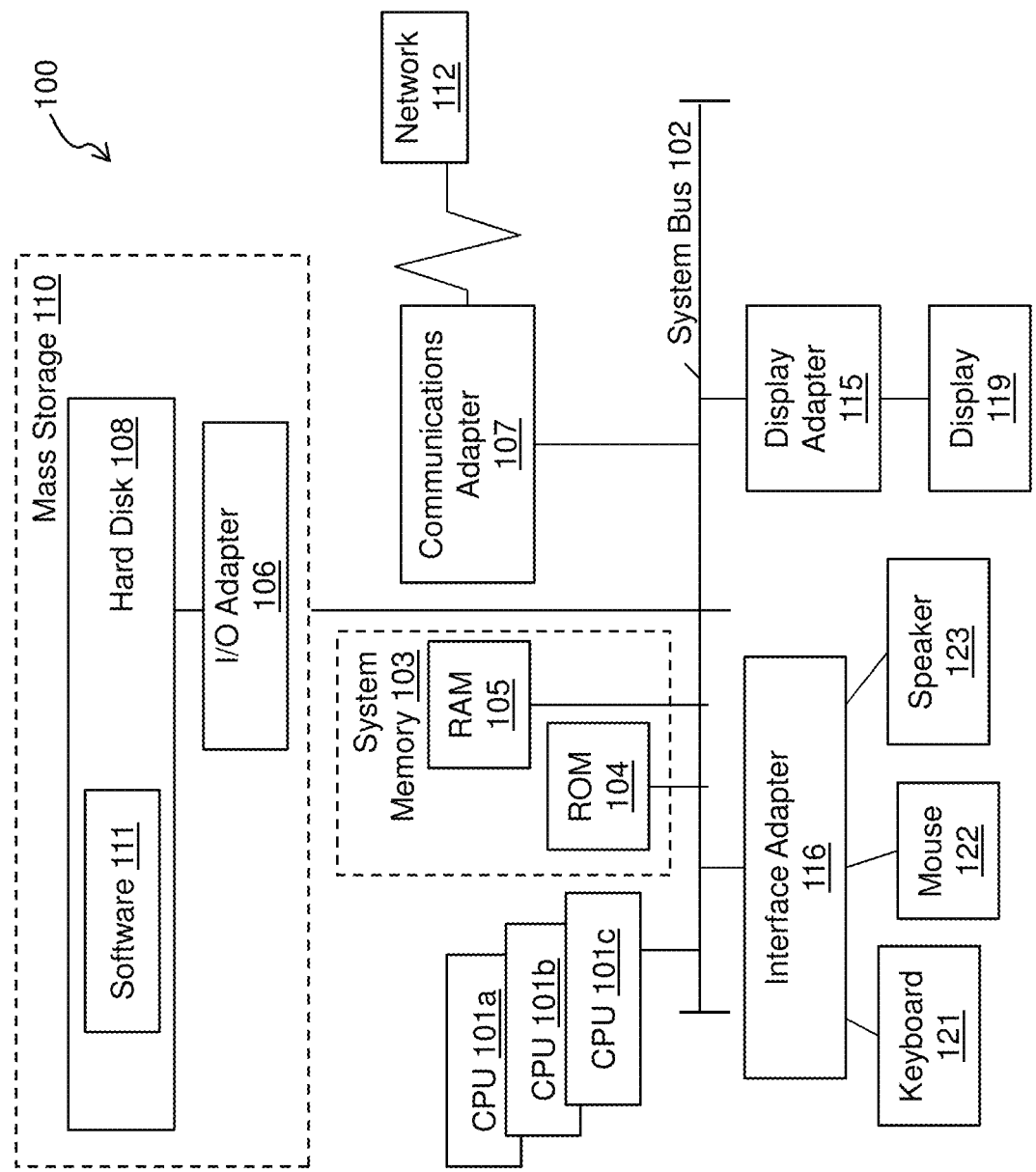
FIG. 1 is a block diagram of an example computer system for use in practicing the teachings herein.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others.

As shown in FIG. 1, the computer system 100 has one or more central processing units (CPU(s)) 101a, 101b, 101c, etc. (collectively or generically referred to as processor(s) 101). The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110. A software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein with reference to FIGS. 2-5. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1.

While this disclosure is discussed in the context of a branch predictor, it will be appreciated by those of ordinary skill in the art that the teachings herein can be applied to any multi-way set associative structure with a limited write ports LRU and multiple pipeline timeframes that need to update the LRU. In branch prediction, there are two main timeframes that need access to the LRU, search/prediction and completion timeframe. During search timeframe, the BTB is read for any known information about branches in the current instruction stream. If branches that are needed for prediction are found in the BTB, this information on the branch needs to be kept around long enough to update it at completion timeframe. Any branches found in the BTB during search time frame are known as dynamic branches and referred to as search time frame hits.

In order to show the importance of a dynamic branch, the sets that contain branches that are used at prediction timeframe are updated to MRU so they are less at risk of being overwritten by older instruction updates flowing through the pipeline.

At completion timeframe, there is a queue of all the branches that need to make updates to the BTB and possibly the LRU. This queue can contain either dynamic branches that need some sort of metadata such as direction or target update, or branches that were not found in the BTB during the search time frame, also known as surprise branches. If a surprise branch is resolved or predicted taken, it is installed in the BTB. In order to know which set of the BTB to install the surprise branch into, the LRU structure is read. The LRU determines which set is the least important in a given row and can be overwritten. Once the surprise branch gets written into the BTB, the LRU structure is updated as well to make the set MRU so it is not overwritten immediately. While prediction timeframe handles updating the LRU structure for dynamic branches, completion timeframe updates the LRU structure for surprise branches.

Figure 2:
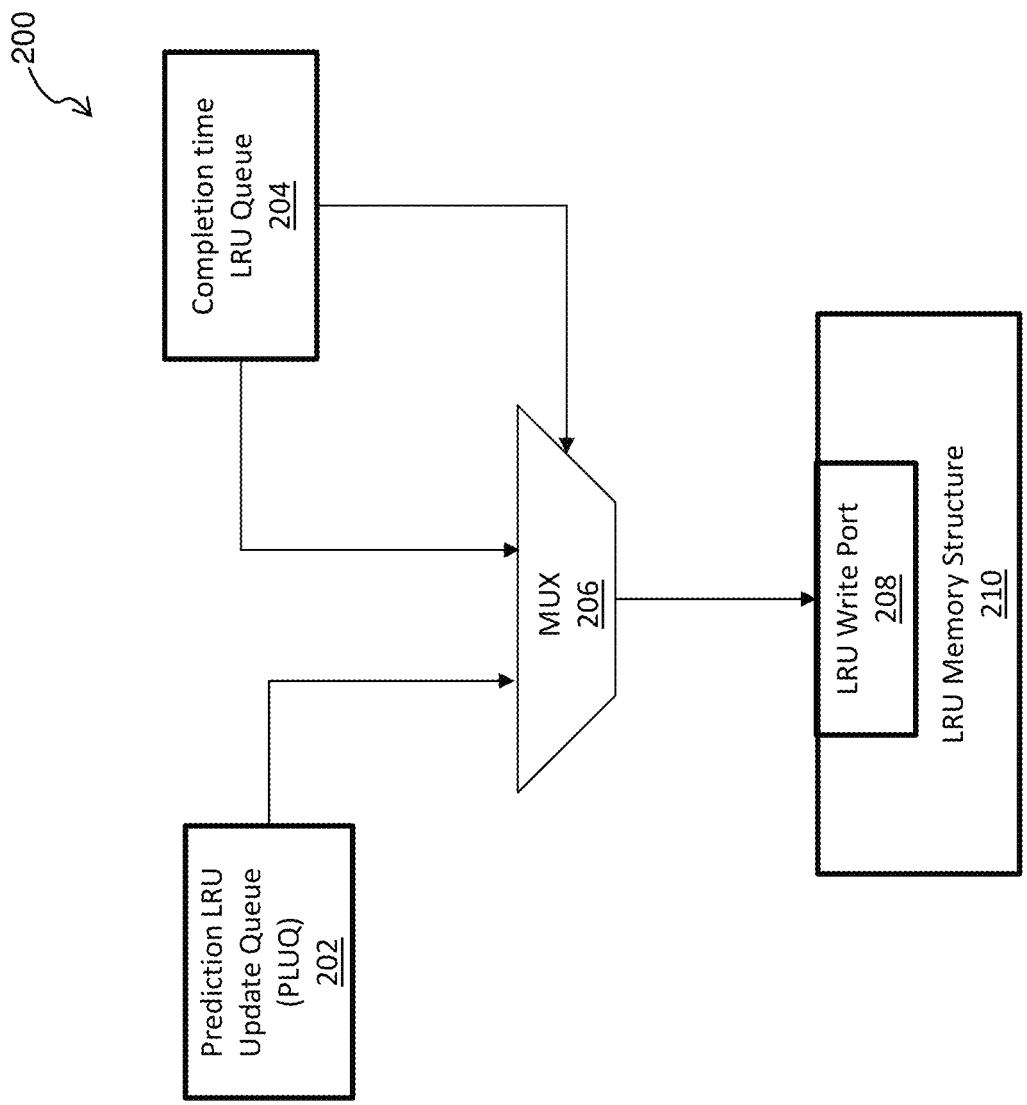
FIG. 2 is a block diagram of an example system for controlling write access to a least recently used memory structure in accordance with an embodiment.

FIG. 2 illustrates a block diagram of an example system 200 for controlling write access to a least recently used memory structure 210. System 200 may be implemented in any suitable computer processor, such as any of CPUs 101a-c of FIG. 1. The system 200 includes a prediction LRU update queue (PLUQ) 202 and a completion time LRU queue 204 that are both in communication with a multiplexer 206. As illustrated, the completion time LRU queue 204 is connected as both a data source and an input selection signal to the multiplexer 206. Accordingly, the multiplexer 206 will pass data from the completion time LRU queue 204 to the LRU write port 208 unless the completion time LRU queue 204 is empty. If the completion time LRU queue 204 is empty, the multiplexer 206 will pass data from the PLUQ 202 to the LRU write port 208. In exemplary embodiments, the completion time queue LRU queue 204 is used for LRU updates and for metadata updates (information about the prediction).

It is to be understood that the block diagram of FIG. 2 is not intended to indicate that the system 200 is to include all of the components shown in FIG. 2. Rather, the system 200 can include any appropriate fewer or additional components not illustrated in FIG. 2.

In exemplary embodiments, the PLUQ 202 is configured to provide access to an LRU memory structure's limited write ports through a processor's BTB completion write queue. In one embodiment, the PLUQ 202 is a separate side structure that queues up the prediction timeframe LRU updates that the branch prediction finds while searching an address space. If the BTB is partitioned on a bank basis (top and bottom bank), a separate PLUQ can be created per bank allowing the processor to have multiple PLUQs and each one's queue as deep as needed. In general, the BTB write queue contents always have higher priority access to the LRU structure than the LRU writes queued up in the PLUQ 202. The BTB write queue consists of branches that are either surprise branches or updates to branches that were predicted incorrectly. Accordingly, when the BTB write queue has a gap in its pipeline, PLUQ writes can be bypassed into the final stage of the BTB write queue. This allows PLUQ writes to simply feed into the LRU pipeline already created and fully utilize the BTB write queue while making the LRU structure smaller and more power efficient by having fewer LRU write ports and fewer transistors/logic to manage multiple reads and writes.

In exemplary embodiments, if there are more than two timeframes that write to the LRU memory structure, all LRU writes can be routed to a timeframe with higher priority. For example, if the PLUQ is full and there is an incoming branch write that needs to be added to the queue, the PLUQ can provide feedback to the branch prediction logic to stall the pipeline until the PLUQ has room, or carry an additional bit for dynamic branches through the pipeline that marks this branch needs to be made MRU at completion time frame since it did not get into the PLUQ. If a dynamic branch requires no BTB updates and only an LRU update, it will still be carried through the pipeline if this marking is set. This ensures that no LRU writes are dropped.

Figure 3:
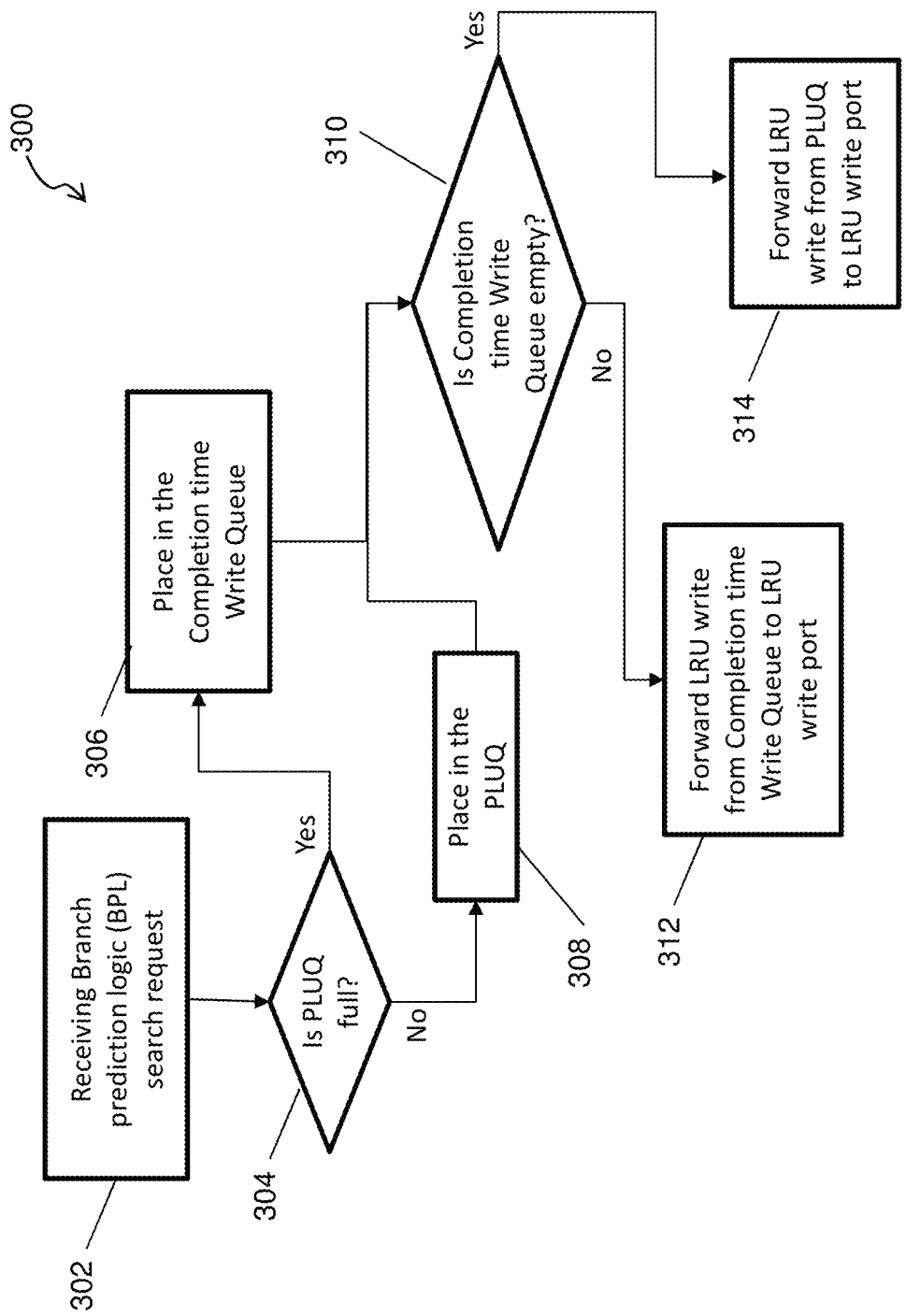
FIG. 3 is a process flow diagram of an example method for controlling write access to a least recently used memory structure in accordance with an embodiment.

FIG. 3 is a process flow diagram of an example method for controlling write access to a least recently used memory structure. The method 300 can be implemented with any suitable computing device, such as any of CPUs 101a-c in the computer system 100 of FIG. 1. The method 300 includes receiving a branch prediction logic (BPL) search time frame request, as shown at block 302. Next, as shown at decision block 304, the method 300 includes determining if the PLUQ is full. If the PLUQ is full, the method 300 proceeds to block 306 and places an LRU write in a completion time write queue. Otherwise, the method 300 proceeds to block 308 and places the BPL search request into the PLUQ.

Next, as shown at decision block 310, the method 300 includes determining if the completion time write queue is empty. If the completion time write queue is empty, the method 300 proceeds to block 314 and forwards a LRU write request from the PLUQ to the write port of the LRU memory structure. Otherwise, the method 300 proceeds to block 312 and forwards a write request from the completion time write queue to the LRU memory structure.

Figure 4A:
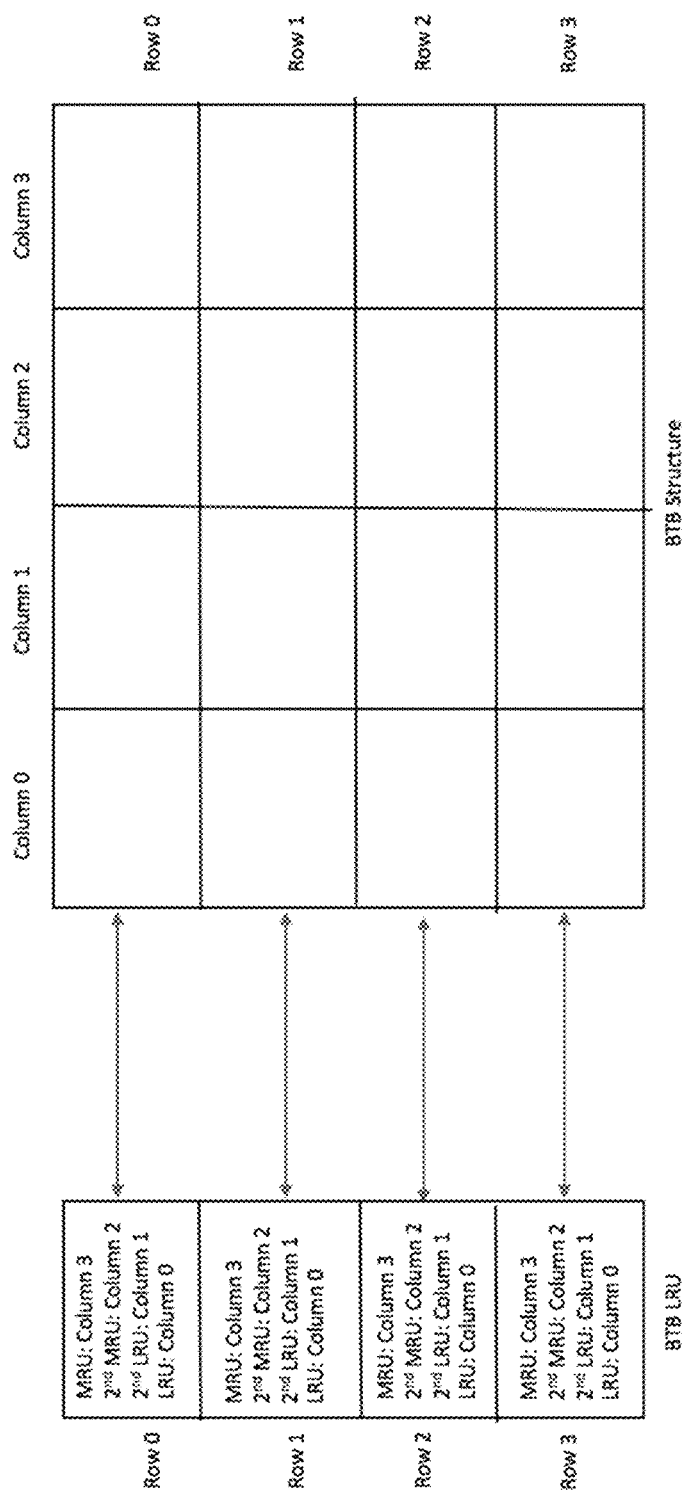
FIGS. 4A, 4B, 4C and 4D are block diagrams of a least recently used memory structure in accordance with an embodiment.
Figure 4B:
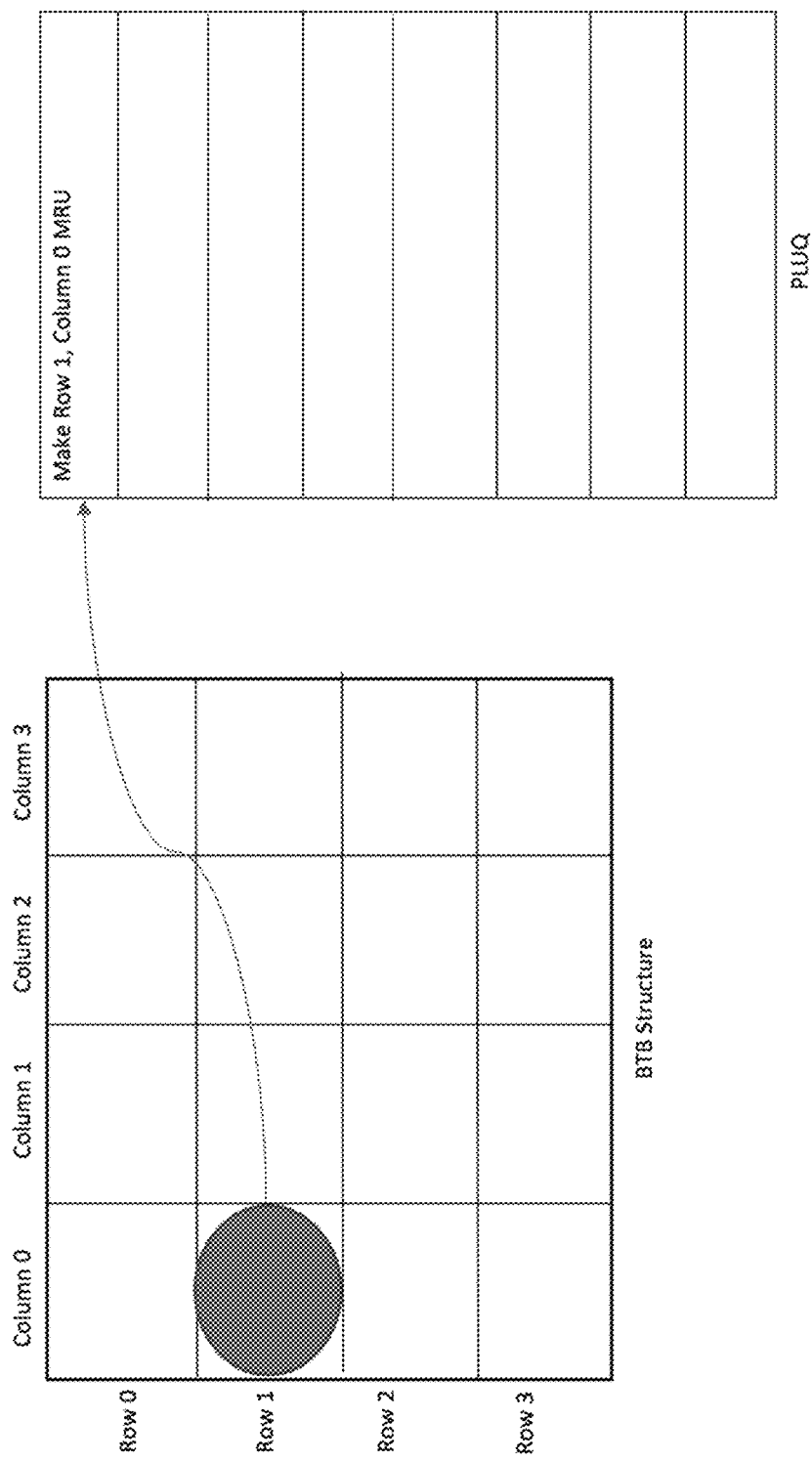
Figure 4C:
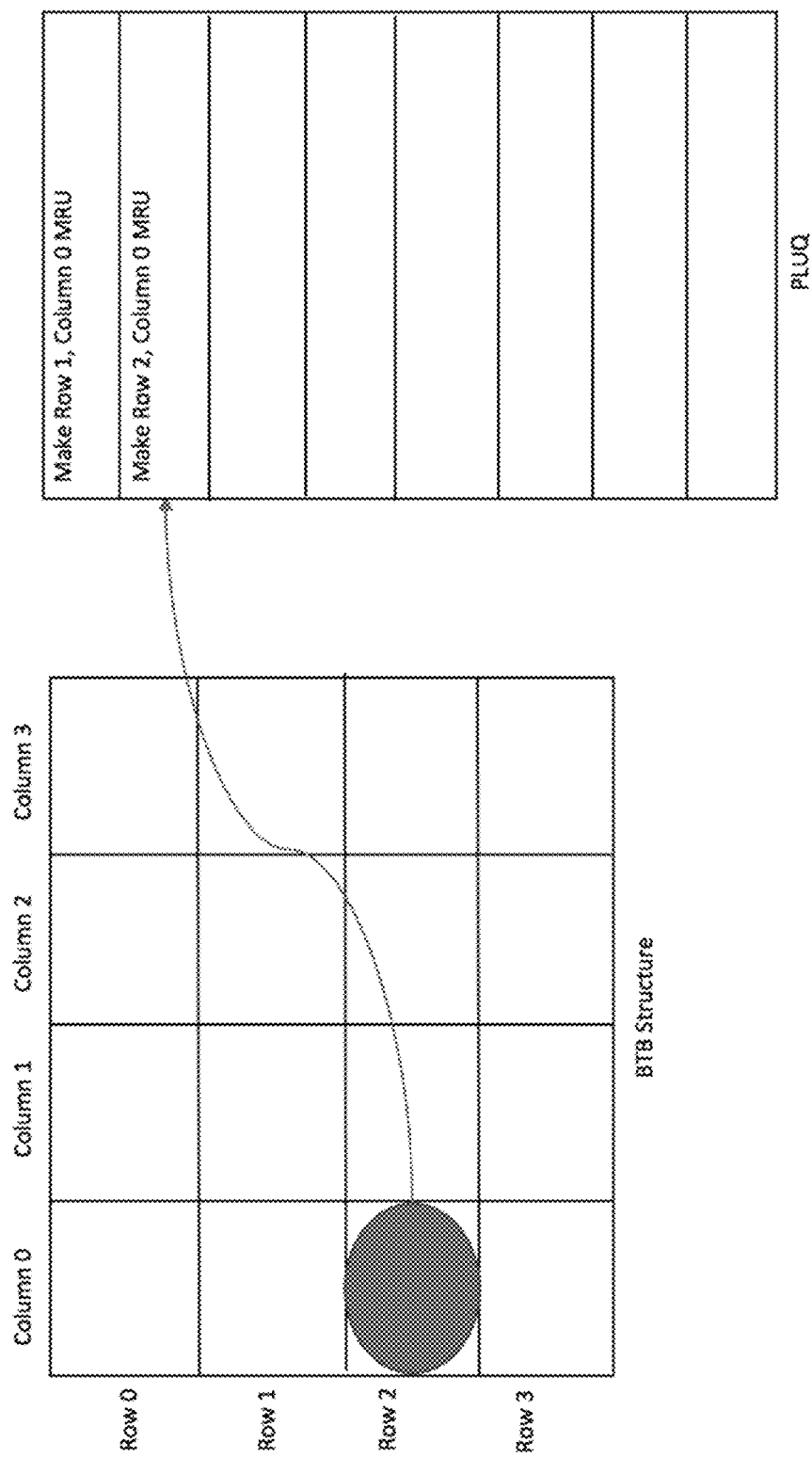
Figure 4D:
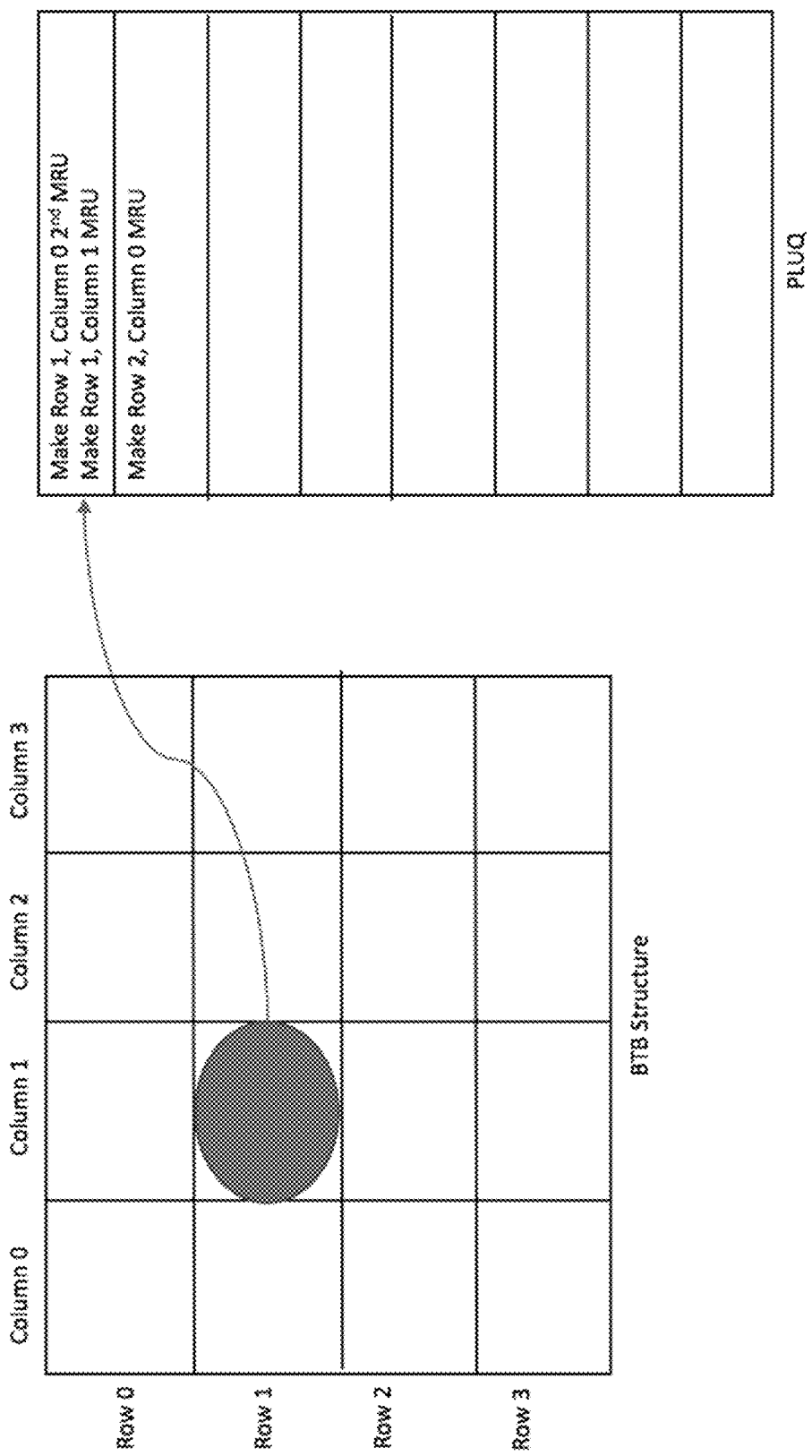

In exemplary embodiments, the PLUQ is configured to reduce power consumption by combining LRU writes to the same row and/or by discarding duplicate write commands. For example, assume there is a four-row, four-column BTB structure with an associated LRU as shown in FIGS. 4A-4D. As shown in FIG. 4B, at prediction timeframe, a branch is first found in row 1 column 0 of the BTB and the associated most recently used (MRU) write is added to the PLUQ. Next, as shown in FIG. 4C, a branch in row 2 column 0 of the BTB is found and the associated MRU write is added to the PLUQ. Next, as shown in FIG. 4D, another branch in row 1 but column 1 is found and the associated MRU write should be added to the PLUQ. Regularly the two LRU writes to row 1 would be serviced one after another causing the BTB array to be powered up twice. However, the PLUQ allows for the MRU write on the second branch in row 1 column 1 to be bypassed and combined with the MRU write for row 1 column 0. As a result, there is only one write that makes both, column 1 the 1st MRU and column 0 the 2nd MRU at the same time. Once these PLUQ writes are combined, only one PLUQ write needs to be passed into the main BTB write queue rather than two individual PLUQ writes. In a similar manner, when there are two LRU writes that want to make the same set MRU for the same row, the second write is dropped and not written into the PLUQ. In exemplary embodiments, using a queue to service LRU writes from prediction timeframe, i.e., PLUQ, allows the ability to see a short history of writes to the LRU and appropriately filter out incoming writes based on the prior knowledge the PLUQ provides.

Figure 5:
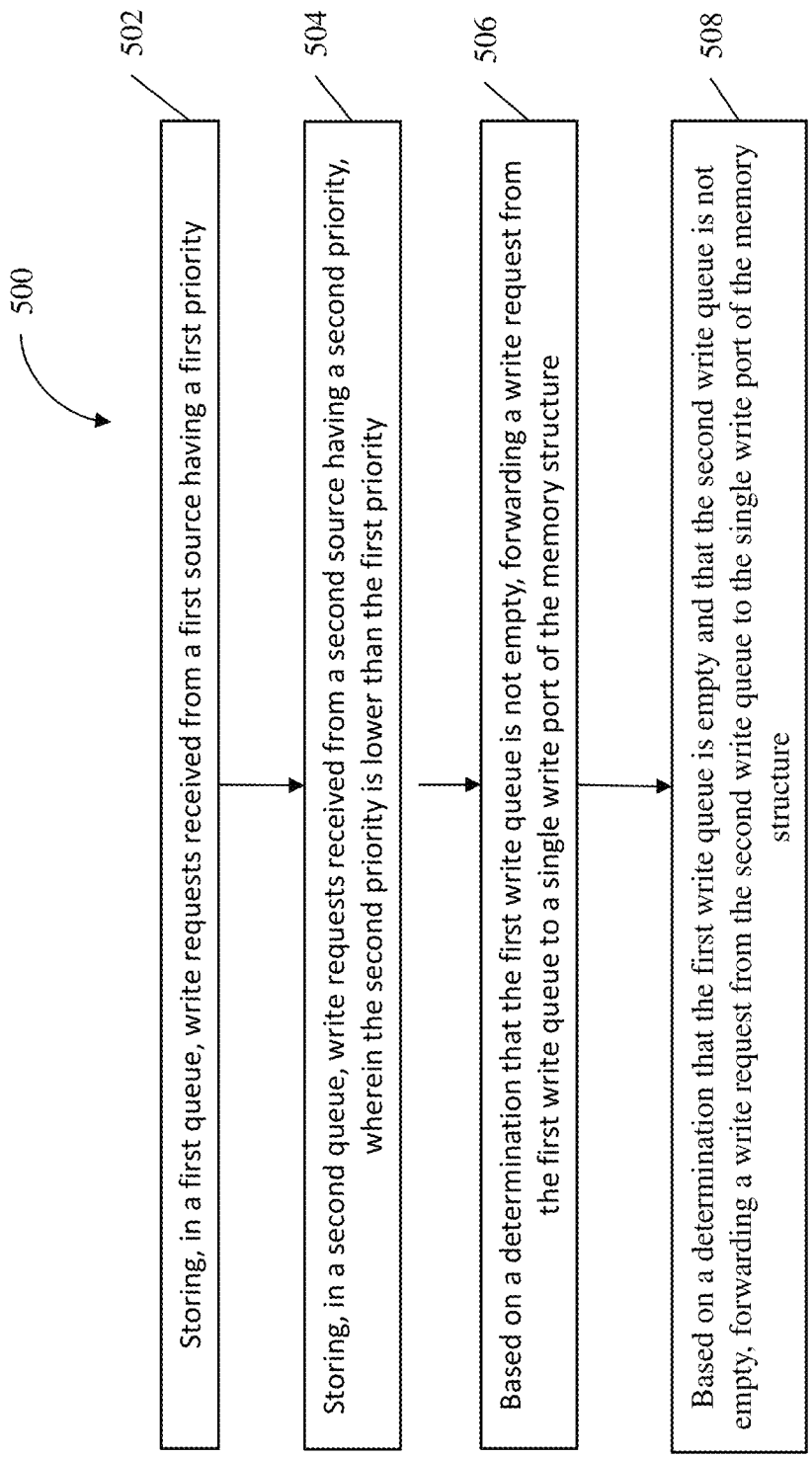
FIG. 5 is a process flow diagram of an example method for controlling write requests to a memory structure having a single write port in accordance with an embodiment.

FIG. 5 is a process flow diagram of an example method for controlling write requests to a memory structure having limited write ports. The method 500 can be implemented with any suitable computing device, such as any of CPUs 101a-c in the computer system 100 of FIG. 1. The method 500 includes storing, in a first queue, write requests received from a first source having a first priority, as shown at block 502. The method 500 also includes storing, in a second queue, write requests received from a second source having a second priority, wherein the second priority is lower than the first priority, as shown at block 504. In exemplary embodiments, the memory structure is a least recently used memory, the write requests received from the first source are completion write requests and the write requests received from the second source are prediction write requests.

As shown at block 506, the method 500 includes forwarding a write request from the first write queue to a single write port of the memory structure based on a determination that the first write queue is not empty. Next, as shown at block 508, the method 500 includes forwarding a write request from the second write queue to the single write port of the memory structure based on a determination that the first write queue is empty and that the second write queue is not empty. In exemplary embodiments, the method 500 includes storing, in the first queue, write requests received from a second source based on a determination that the second queue is full. In one embodiment, the method 500 includes analyzing the write requests stored in the second queue and combining write requests that are directed to a same portion of the memory structure. In another embodiment, the method 500 includes analyzing the write requests stored in the second queue and removing duplicate write requests from the second queue.

In exemplary embodiments, an LRU memory structure having a single write port is provided. By limiting the number of write ports on the LRU memory structure to one, the area on the chip needed for the LRU memory structure is reduced and the amount of power consumed by the LRU structure is also reduced. Although discussed primarily with respect to an LRU memory structure having a single write port, the methods and systems disclosed herein may also be applied to LRU structures that have more than one write port, where at least one of the write ports are configured to service multiple queues.

In exemplary embodiments, an LRU memory structure includes a write port that is configured to be shared by more than one queue. A selection algorithm is used to determine which queue will be given priority to send write requests to the write port. The selection algorithm is a function of a state associated with the first queue and the second queue. In one embodiment, the state of the first queue and/or the second queue includes whether the queue is empty. In another embodiment, the state of the first queue and/or the second queue includes a percentage occupancy of the queue, i.e., how full the queue is. In a further embodiment, the state of the first queue and/or the second queue includes an age of the oldest item in the queue. These and other characteristics of the queues can be used by the selection algorithm to determine which queue to treat as a selected queue, i.e., the queue that will be permitted to send write requests to the write port. Once a selected queue is identified, a write request from the selected queue is forwarded to a write port of the memory structure.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for controlling write requests to a memory structure having limited write ports, the method comprising:
    storing, in a first queue, write requests received from a first source having a first priority;
    storing, in a second queue, write requests received from a second source having a second priority, wherein the second priority is lower than the first priority;
    identifying a selected queue from the first queue and the second queue based on a selection algorithm, which is a function of a state associated with the first queue and the second queue,
    forwarding a write request from the selected queue to a write port of the memory structure; and
    storing, in the first queue, write requests received from a second source based on a determination that the second queue is full.

2. The computer-implemented method of claim 1, wherein the selection algorithm identifies the first queue as the selected queue based on a determination that the first queue is not empty.

3. The computer-implemented method of claim 1, wherein the selection algorithm identifies the second queue as the selected queue based on a determination that the first queue is empty.

4. The computer-implemented method of claim 1, further comprising analyzing the write requests stored in the second queue and combining write requests that are directed to a same portion of the memory structure.

5. The computer-implemented method of claim 1, further comprising analyzing the write requests stored in the second queue and removing duplicate write requests from the second queue.

6. The computer-implemented method of claim 1, wherein the memory structure is a least recently used memory structure.

7. An apparatus including hardware logic to control write requests to a memory structure having limited write ports, the apparatus being configured to:
    store, in a first queue, write requests received from a first source having a first priority;
    store, in a second queue, write requests received from a second source having a second priority, wherein the second priority is lower than the first priority;
    identify a selected queue from the first queue and the second queue based on a selection algorithm, which is a function of a state associated with the first queue and the second queue, forward a write request from the selected queue to a write port of the memory structure; and store, in the first queue, write requests received from a second source based on a determination that the second queue is full.

8. The apparatus of claim 7, wherein the selection algorithm identifies the first queue as the selected queue based on a determination that the first queue is not empty.

9. The apparatus of claim 7, wherein the selection algorithm identifies the second queue as the selected queue based on a determination that the first queue is empty.

10. The apparatus of claim 7, wherein the apparatus is further configured to analyze the write requests stored in the second queue and combining write requests that are directed to a same portion of the memory structure.

11. The apparatus of claim 7, wherein the apparatus is further configured to analyze the write requests stored in the second queue and removing duplicate write requests from the second queue.

12. The apparatus of claim 7, wherein the memory structure is a least recently used memory structure.

13. A system for controlling write requests to a memory structure having limited write ports, the system comprising:

a first queue configured to store write requests received from a first source having a first priority;

a second queue configured to store write requests received from a second source having a second priority, wherein the second priority is lower than the first priority; and a multiplexer in communication with the first queue and the second queue, wherein the multiplexer is configured to:

forward a write request from the first queue to a write port of the memory structure based on a determination that the first queue is not empty;

forward a write request from the second queue to the write port of the memory structure based on a determination that the first write queue is empty and that the second queue is not empty; and store, in the first queue, write requests received from a second source based on a determination that the second queue is full.

14. The system of claim 13, further comprising logic configured to analyze the write requests stored in the second queue and combine write requests that are directed to a same portion of the memory structure.

15. The system of claim 13, further comprising logic configured to analyze the write requests stored in the second queue and removing duplicate write requests from the second queue.

16. The system of claim 13, wherein the write requests received from the first source are completion write requests.

17. The system of claim 16, wherein the write requests received from the second source are prediction write requests.

* * * * *